United States Patent
Chen et al.

(10) Patent No.: US 12,371,360 B2
(45) Date of Patent: Jul. 29, 2025

(54) TREATMENT METHOD FOR OILY SLUDGE AND METHOD FOR SOIL REMEDIATION

(71) Applicants: Tianjin University, Tianjin (CN); Tianjin University of Commerce, Tianjin (CN)

(72) Inventors: Guanyi Chen, Tianjin (CN); Fawei Lin, Tianjin (CN); Zhanjun Cheng, Tianjin (CN); Jiantao Li, Tianjin (CN); Beibei Yan, Tianjin (CN); Xiaoqiang Cui, Tianjin (CN); Ning Li, Tianjin (CN)

(73) Assignees: Tianjin University, Tianjin (CN); Tianjin University of Commerce, Tianjin (CN)

( * ) Notice: Subject to any disclaimer, the term of this patent is extended or adjusted under 35 U.S.C. 154(b) by 0 days.

(21) Appl. No.: 18/041,580

(22) PCT Filed: Oct. 17, 2022

(86) PCT No.: PCT/CN2022/125625
§ 371 (c)(1),
(2) Date: Feb. 14, 2023

(87) PCT Pub. No.: WO2023/193419
PCT Pub. Date: Oct. 12, 2023

(65) Prior Publication Data
US 2024/0270621 A1   Aug. 15, 2024

(30) Foreign Application Priority Data
Apr. 8, 2022   (CN) .......................... 202210382652.0

(51) Int. Cl.
*C10B 53/00* (2006.01)
*B09C 1/08* (2006.01)
(Continued)

(52) U.S. Cl.
CPC ................ *C02F 11/10* (2013.01); *B09C 1/08* (2013.01); *C10B 53/02* (2013.01); *C02F 2101/32* (2013.01); *C02F 2103/365* (2013.01)

(58) Field of Classification Search
CPC ........................... C02F 11/10; C02F 2101/32; C02F 2103/365; B09C 1/08; B09C 1/00;
(Continued)

(56) References Cited

U.S. PATENT DOCUMENTS

| 3,565,784 | A | * | 2/1971 | Schlinger et al. | ........ C01B 3/36 201/37 |
| 4,013,516 | A | * | 3/1977 | Greenfield | .............. C10B 47/30 159/DIG. 25 |

(Continued)

FOREIGN PATENT DOCUMENTS

CN   114082752 A   *   2/2022

OTHER PUBLICATIONS

Lin et al; "Preparation of Fe-char catalyst from tank cleaning oily sludge for the catalytic cracking of oily sludge"; Mar. 2019; URL: https://www.sciencedirect.com/science/article/pii/S0165237018309744 (Year: 2019).*

*Primary Examiner* — Edwin J Toledo-Duran
(74) *Attorney, Agent, or Firm* — Fox Rothschild LLP

(57) ABSTRACT

The present disclosure provides a treatment method for oily sludge and a method for soil remediation. The treatment method for oily sludge includes: mixing the oily sludge with target biochar uniformly according to a first preset mass ratio, and conducting catalytic pyrolysis at a first preset temperature to achieve efficient removal of petroleum hydrocarbons, to obtain a pyrolysis residue used for soil remediation. In the present disclosure, the method realizes resource utilization and harmless utilization of the pyrolysis residue.

13 Claims, 8 Drawing Sheets

(51) Int. Cl.
*C02F 11/10* (2006.01)
*C10B 53/02* (2006.01)
C02F 101/32 (2006.01)
C02F 103/36 (2006.01)

(58) Field of Classification Search
CPC .......... B09C 1/10; C10B 53/02; C10B 53/00; C10B 57/06; Y02W 10/40
See application file for complete search history.

(56) References Cited

U.S. PATENT DOCUMENTS

| | | | | |
|---|---|---|---|---|
| 10,487,265 | B1* | 11/2019 | Tian | C05G 1/00 |
| 2010/0083575 | A1* | 4/2010 | Varadaraj | C10J 3/72 |
| | | | | 48/209 |
| 2012/0160741 | A1* | 6/2012 | Gong | B01J 8/24 |
| | | | | 585/653 |
| 2015/0065762 | A1* | 3/2015 | Agblevor | B01J 23/94 |
| | | | | 585/16 |
| 2016/0053182 | A1* | 2/2016 | Ericsson | C10B 41/08 |
| | | | | 201/20 |
| 2018/0142157 | A1* | 5/2018 | Lin | C10B 53/02 |
| 2018/0208518 | A1* | 7/2018 | Beaudoin Nadeau | B09C 1/105 |
| 2023/0249998 | A1* | 8/2023 | Wang | C02F 3/106 |
| | | | | 210/617 |
| 2024/0270621 | A1* | 8/2024 | Chen | C02F 11/10 |

\* cited by examiner

TREATMENT METHOD FOR OILY SLUDGE AND METHOD FOR SOIL REMEDIATION

CROSS REFERENCE TO RELATED APPLICATIONS

The present application is the U.S. national phase of International Patent Application No. PCT/CN2022/125625, titled "TREATMENT METHOD FOR OILY SLUDGE AND METHOD FOR SOIL REMEDIATION," filed on Oct. 17, 2022, which claims the priority to Chinese Patent Application No. CN202210382652.0, titled "TREATMENT METHOD FOR OILY SLUDGE AND METHOD FOR SOIL REMEDIATION", filed with China National Intellectual Property Administration (CNIPA) on Apr. 8, 2022, which is incorporated herein by reference in its entirety.

TECHNICAL FIELD

The present disclosure relates to the technical field of resource utilization and harmless treatment of oily sludge, in particular to a treatment method for oily sludge and a method for soil remediation.

BACKGROUND

Oily sludge is a petroleum-containing hazardous waste (HW08) generated in the petroleum and petrochemical industry, which has dual attributes of resource and environmental pollutions. Treatment and disposal techniques and methods of the oily sludge are required to meet the objectives of resource reutilization and environmental friendliness.

In related technologies, oily sludge can be separated into valuable petroleum resources and treatment residues, producing less secondary pollutants. However, for oily sludge rich in heavy components that are refractory to degradation and high in N/S/Cl, heavy metals and other harmful elements, conventional pyrolysis still causes release of a large amount of volatile pollutants containing N/S/Cl during the pyrolysis, incomplete removal of petroleum hydrocarbons, high energy consumption, and unknown environmental destination of the remaining pyrolysis residues, making it difficult to achieve complete harmlessness. Catalytic pyrolysis can achieve higher efficiency removal of petroleum hydrocarbons in oily sludge at lower temperature with suitable pyrolysis time, and inhibit the release of pollutants to a certain extent. However, it is difficult to separate the catalyst from the pyrolysis residue, the treatment of pyrolysis residues also consumes a large amount of energy or occupies landfill storage capacity, and the catalyst becomes a one-time consumable.

SUMMARY

In view of this, the present disclosure proposes a treatment method for oily sludge and a method for soil remediation in order to at least partly solve the above technical problems.

The present disclosure provides a treatment method for oily sludge, including: mixing the oily sludge with target biochar uniformly according to a first preset mass ratio, and conducting catalytic pyrolysis at a first preset temperature to achieve efficient removal of petroleum hydrocarbons, to obtain a pyrolysis residue used for soil remediation.

Preferably, a preparation method of the target biochar includes: subjecting a biomass raw material to anaerobic pyrolysis at a second preset temperature to obtain the target biochar.

Preferably, the biomass raw material includes at least one of the following: waste edible fungus residues, distiller's grains, livestock and poultry manure, moldy biomass, fruit shells, straw, wood chips, and bamboo chips.

Preferably, the second preset temperature includes 600° C. to 900° C.

Preferably, the second preset temperature is 600° C., 700° C., 800° C., or 900° C.

Preferably, the biomass raw material has a particle size of 20 mesh to 40 mesh.

Preferably, the biomass raw material has a particle size of 20 mesh, 30 mesh, or 40 mesh.

Preferably, a gas atmosphere of the anaerobic pyrolysis includes an inert gas atmosphere, and the inert gas includes at least one or a combination of two or more selected from the group consisting of nitrogen, argon, ammonia, and carbon dioxide.

Preferably, the first preset temperature ranges from 350° C. to 550° C.

Preferably, the first preset temperature is 350° C., 400° C., 450° C., or 500° C.

Preferably, the first preset mass ratio is 8:1 to 1:1.

Preferably, the first preset mass ratio is 8:1, 7:1, 6:1, 5:1, 4:1, 3:1, 2:1, or 1:1.

The present disclosure further provides a pyrolysis residue obtained by the treatment method.

The present disclosure further provides use of the pyrolysis residue in soil remediation.

The present disclosure further provides a method for soil remediation, including: mixing a pyrolysis residue with polluted soil uniformly according to a second preset mass ratio to remediate the polluted soil, where the pyrolysis residue is the pyrolysis residue mentioned above.

Preferably, the second preset mass ratio includes a dry basis mass ratio, and the dry basis mass ratio is 5:95 to 30:70.

Preferably, the second preset mass ratio includes a dry basis mass ratio, and the dry basis mass ratio is 5:95, 10:90, 10:70, or 30:70.

According to an example of the present disclosure, after uniformly mixing the oily sludge with the target biochar according to a first preset mass ratio, catalytic pyrolysis is conducted at a first preset temperature to obtain a pyrolysis residue. Due to the rich pore structure and functional groups, during the catalytic pyrolysis of oily sludge, the target biochar is combined with petroleum hydrocarbon molecules in oily sludge through electrostatic adsorption and complexation, prolonging a reaction time of the catalytic pyrolysis, reducing activation energy of desorption and cracking reactions for the petroleum hydrocarbons. Therefore, the petroleum hydrocarbons in the oily sludge are fully cracked at a lower temperature, so as to improve a pyrolysis efficiency. The target biochar is rich in acidic sites and hydroxyl radicals, providing active sites for petroleum hydrocarbon cracking. The abundant mineral components in biochar such as calcium, iron and other metal oxides participate in the catalytic cracking of macromolecular petroleum hydrocarbons. In addition, the carbon element in the target biochar can be used as a reducing agent to participate in the reaction and promote the cracking of petroleum hydrocarbons. The water vapor and carbon monoxide released during the pyrolysis can further participate in the cracking of petroleum hydrocarbons on a surface of the target biochar. Meanwhile, the catalytic effect of the target biochar promotes the cracking of macromolecular organic pollutants to generate small-molecular inorganic pollutants; furthermore, combined with adsorption and complexation effects of the target biochar, the residue immobilization of harmful substances can be realized, to reduce the release of pollutants to oil and gas products during the pyrolysis. In addition, the target biochar as a catalyst remains in the pyrolysis residue without separation. With the help of a synergistic effect of target biochar and soil microorganisms, residues and soil heavy metals can be immobilized and stabilized, thereby promoting the fixation of soil nutrients and adjusting the soil pH. The biochar can also be used as a carbon fertilizer to improve soil fertility, accelerate efficient removal of soil organic pollutants, remediate polluted soil, and realize resourceful and harmless utilization of the pyrolysis residue.

DETAILED DESCRIPTION OF THE EMBODIMENTS

Figure 1:
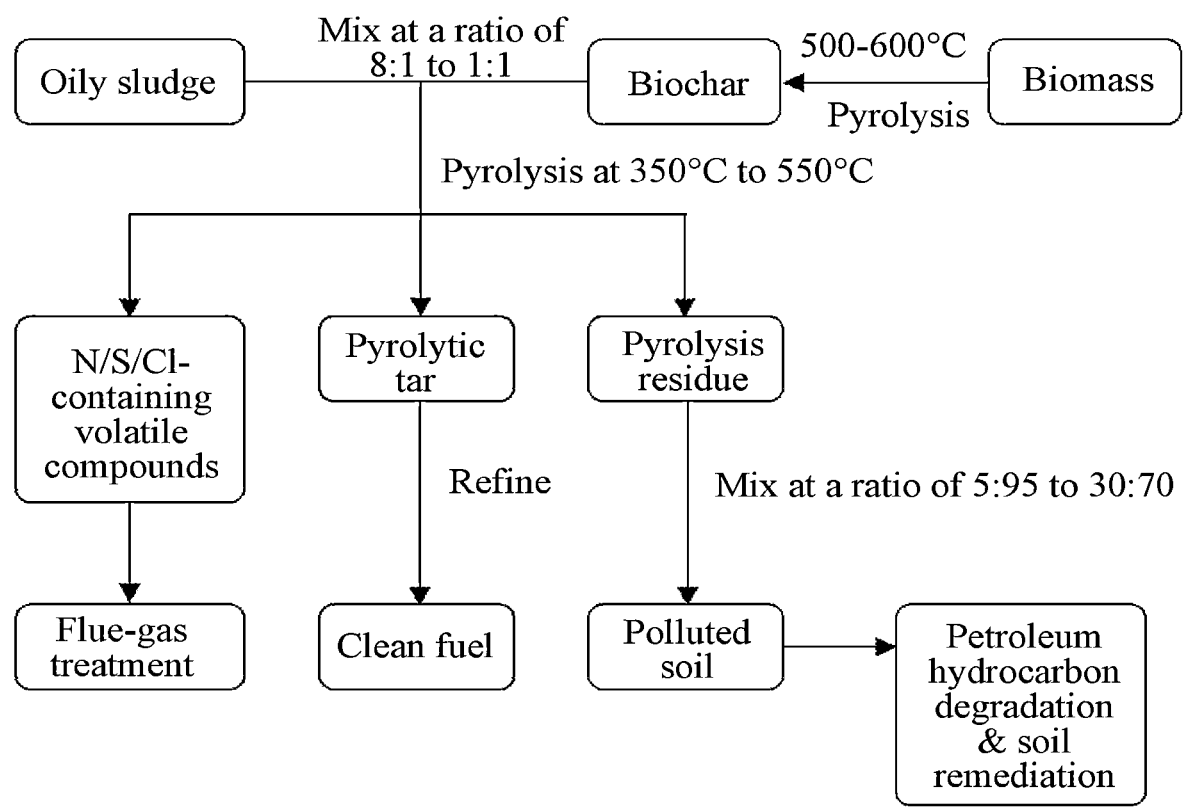
FIG. 1 schematically shows a schematic flow chart of a treatment method for oily sludge according to an example of the present disclosure.

For making the objectives, technical solutions and advantages of the present disclosure clearer, the present disclosure will be described in further detail below in conjunction with the specific examples with reference to the accompanying drawings.

In oily sludge pyrolysis technologies, oily sludge can be separated into valuable petroleum resources and treatment residues, producing less secondary pollutants. For example, Patents CN108675589A and CN108675590A illustrated that pyrolysis technology was beneficial to solve the difficult problem of oilfield sludge treatment. However, for oily sludge rich in heavy components that are refractory to degradation and high in N/S/Cl, heavy metals and other harmful elements, conventional pyrolysis still causes release of a large amount of volatile pollutants containing N/S/Cl during the pyrolysis, incomplete removal of petroleum hydrocarbons, high energy consumption, and unknown environmental destination of the remaining pyrolysis residues, making it difficult to achieve complete harmlessness. Catalytic pyrolysis can achieve higher efficiency removal of petroleum hydrocarbons in oily sludge at lower temperature with suitable pyrolysis time, and inhibit the release of pollutants to a certain extent. Patent CN201610378537.0 disclosed a method for in-situ suppression and removal of a nitrogen-containing pollutant in pyrolysis and gasification of a solid waste using an exogenous catalyst. However, the difficulty in subsequent separation of the catalyst not only increases the treatment cost, but also faces more complex challenges in the disposal of pyrolysis residues. The catalyst becomes a one-time consumable. The existing disposal methods of oily sludge pyrolysis residue mainly include incineration and safe landfill, which still need to consume a large amount of energy or occupy landfill storage capacity. In addition, Patents CN105273790A, CN105709683A, and CN106824078B disclosed methods for preparing an adsorption material from oily sludge pyrolysis residues, which are difficult to achieve large-scale application at present.

In view of this, the present disclosure provides a treatment method for oily sludge, including: mixing the oily sludge with target biochar uniformly according to a first preset mass ratio, and conducting catalytic pyrolysis at a first preset temperature to achieve efficient removal of petroleum hydrocarbons, to obtain a pyrolysis residue used for soil remediation.

According to an example of the present disclosure, a preparation method of the target biochar includes: subjecting a biomass raw material to anaerobic pyrolysis at a second preset temperature to obtain the target biochar.

According to an example of the present disclosure, the biomass raw material includes at least one of the following: waste edible fungus residues, distiller's grains, livestock and poultry manure, moldy biomass, fruit shells, straw, wood chips, and bamboo chips.

According to an example of the present disclosure, the second preset temperature includes 600° C. to 900° C., such as 600° C., 700° C., 800° C., and 900° C.

According to an example of the present disclosure, the biomass raw material has a particle size of 20 mesh to 40 mesh, such as 20 mesh, 30 mesh, and 40 mesh.

According to an example of the present disclosure, a gas atmosphere of the anaerobic pyrolysis includes an inert gas atmosphere, and the inert gas includes at least one or a combination of two or more selected from the group consisting of nitrogen, argon, ammonia, and carbon dioxide.

According to an example of the present disclosure, the first preset temperature ranges from 350° C. to 550° C., such as 350° C., 400° C., 450° C., and 500° C.

According to an example of the present disclosure, the first preset mass ratio is 8:1 to 1:1, such as 8:1, 7:1, 6:1, 5:1, 4:1, 3:1, 2:1, and 1:1.

The present disclosure further provides a pyrolysis residue obtained by the treatment method.

The present disclosure further provides use of the pyrolysis residue in soil remediation.

The present disclosure further provides method for soil remediation, including: mixing a pyrolysis residue with polluted soil uniformly according to a second preset mass ratio to remediate the polluted soil, where the pyrolysis residue is obtained by the treatment method for oily sludge.

According to an example of the present disclosure, the second preset mass ratio includes a dry basis mass ratio, and the dry basis mass ratio is 5:95 to 30:70, such as 5:95, 10:90, 10:70, and 30:70.

FIG. 1 schematically shows a schematic flow chart of a treatment method for oily sludge according to an example of the present disclosure.

As shown in FIG. 1, the treatment method for oily sludge of this example included:

Pleurotus nebrodensis residues with a particle size of 20 mesh were sent to a fixed bed for pyrolysis in a nitrogen atmosphere at 600° C. for 60 min, and the target biochar was obtained after natural cooling to a room temperature;

Oily sludge and the target biochar were mechanically mixed in a mass ratio of 2:1, loaded into a quartz boat and sent to a fixed bed for catalytic pyrolysis at 350° C. to 550° C. for 30 min; and A catalytic pyrolysis residue and polluted soil were mixed evenly at a dry basis mass ratio of 10:90, and the petroleum hydrocarbon degradation and soil remediation effect of the pyrolysis residue were analyzed and tested.

According to an example of the present disclosure, after uniformly mixing the oily sludge with the target biochar according to a first preset mass ratio, catalytic pyrolysis is conducted at a first preset temperature to obtain a pyrolysis residue. Due to the rich pore structure and functional groups, during the catalytic pyrolysis of oily sludge, the target biochar is combined with petroleum hydrocarbon molecules in oily sludge through electrostatic adsorption and complexation, prolonging a reaction time of the catalytic pyrolysis, reducing activation energy of desorption and cracking reactions for the petroleum hydrocarbons. Therefore, the petroleum hydrocarbons in the oily sludge are fully cracked at a lower temperature, so as to improve a pyrolysis efficiency. The target biochar is rich in acidic sites and hydroxyl radicals, providing active sites for petroleum hydrocarbon cracking. The abundant mineral components in biochar such as calcium, iron and other metal oxides participate in the catalytic cracking of macromolecular petroleum hydrocarbons. In addition, the carbon element in the target biochar can be used as a reducing agent to participate in the reaction and promote the cracking of petroleum hydrocarbons. The water vapor and carbon monoxide released during the pyrolysis can further participate in the cracking of petroleum hydrocarbons on a surface of the target biochar. Meanwhile, the catalytic effect of the target biochar promotes the cracking of macromolecular organic pollutants to generate small-molecular inorganic pollutants; furthermore, combined with adsorption and complexation effects of the target biochar, the residue immobilization of harmful substances can be realized, to reduce the release of pollutants to oil and gas products during the pyrolysis. In addition, the target biochar as a catalyst remains in the pyrolysis residue without separation. With the help of a synergistic effect of target biochar and soil microorganisms, residues and soil heavy metals can be immobilized and stabilized, thereby promoting the fixation of soil nutrients and adjusting the soil pH. The biochar can also be used as a carbon fertilizer to improve soil fertility, accelerate efficient removal of soil organic pollutants, remediate polluted soil, and realize resourceful and harmless utilization of the pyrolysis residue.

Figure 2A:
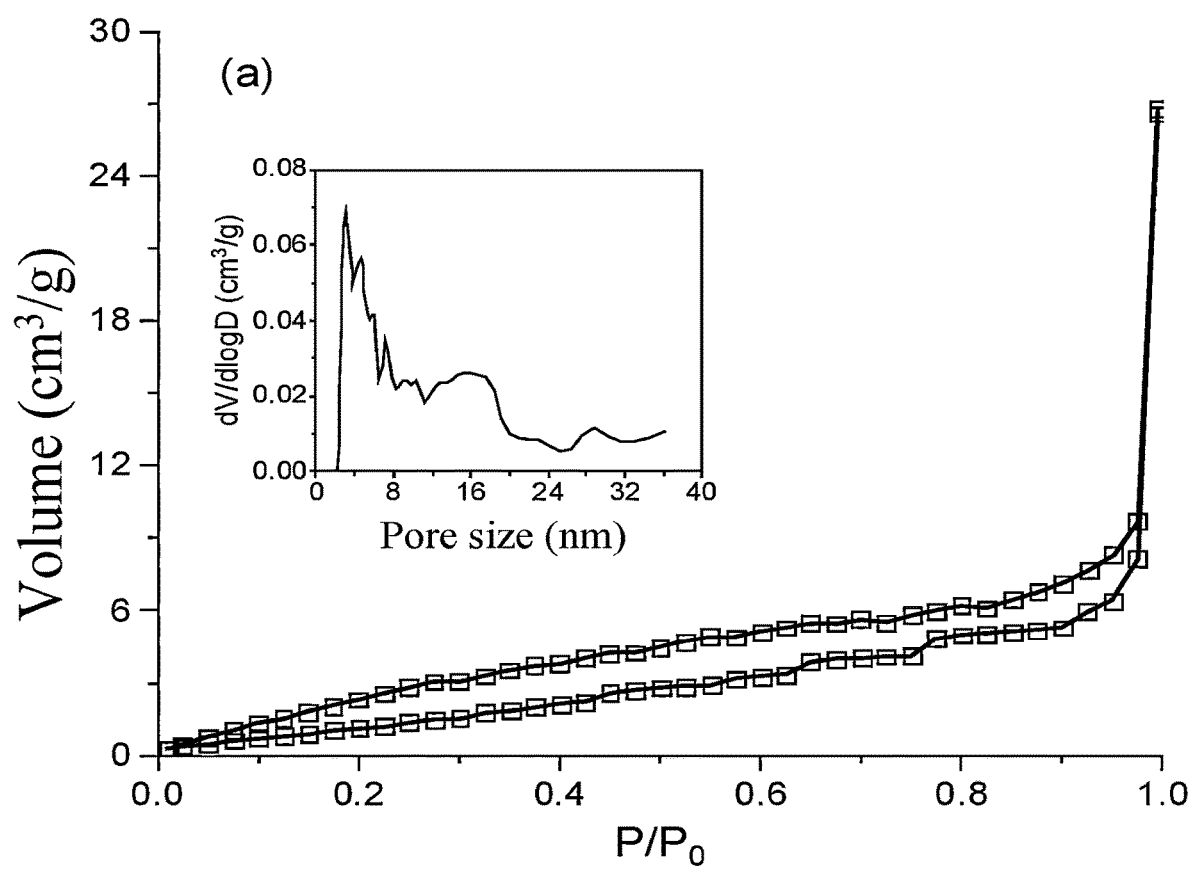
FIG. 2A schematically shows a nitrogen absorption-desorption curve of target biochar.

FIG. 2A schematically shows a nitrogen absorption-desorption curve of target biochar.

As shown in FIG. 2A, the target biochar had a specific surface area of 14.09 m$^2$/g, a pore volume of 0.0359 cm$^2$/g, and an average pore size of 3.169 nm, dominated by micropores and mesoporous pores.

Figure 2B:
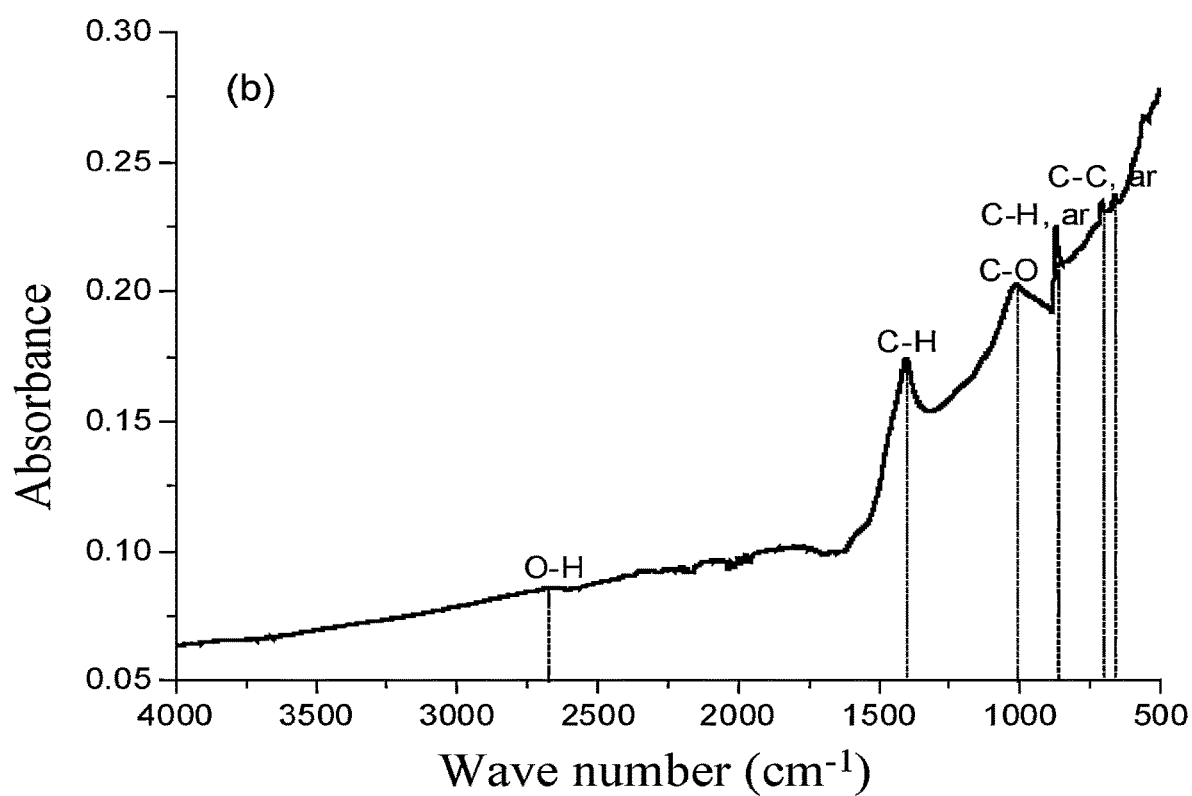
FIG. 2B schematically shows functional groups on a surface of the target biochar.

FIG. 2B schematically shows functional groups on a surface of the target biochar.

As shown in FIG. 2B, a surface of the target biochar contained oxygen-containing functional groups such as —OH and C—O, adsorbing pollutant molecules.

Figure 3A:
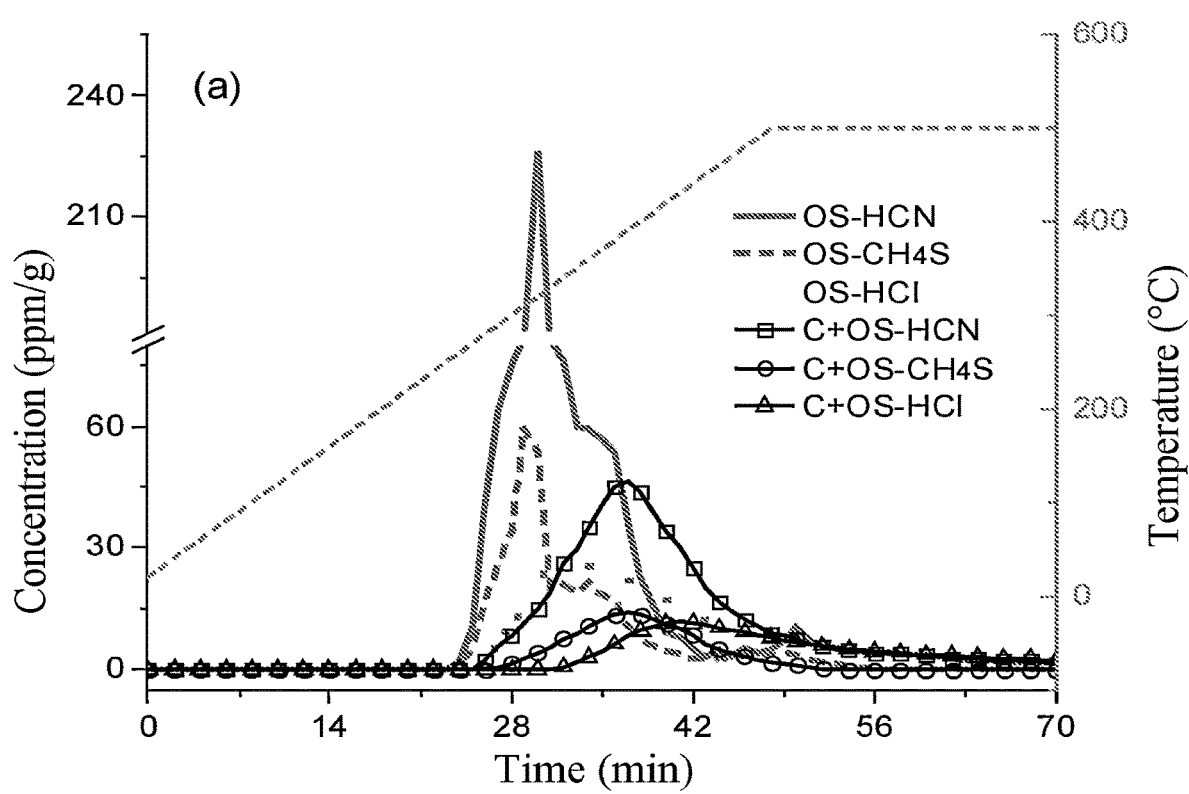
FIG. 3A to FIG. 3B schematically show an influence of the target biochar on catalytic pyrolysis of the oily sludge according to an example of the present disclosure.
Figure 3B:
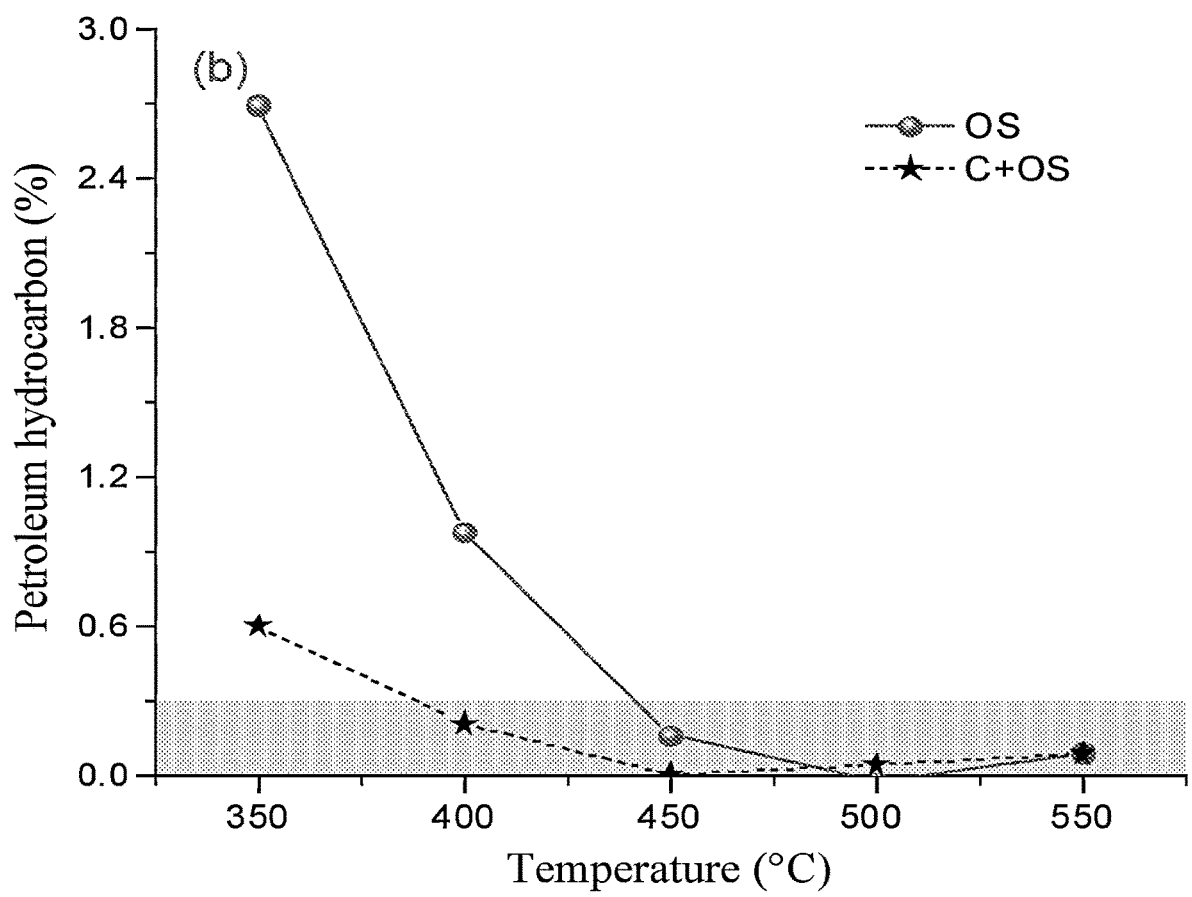

FIG. 3A to FIG. 3B schematically show an influence of the target biochar on catalytic pyrolysis of the oily sludge according to an example of the present disclosure.

As shown in FIG. 3A and FIG. 3B, using biochar as a catalyst, the volatile pollutants containing N/S/Cl released during the pyrolysis of oily sludge and the content of petroleum hydrocarbons in the pyrolysis residue were significantly reduced; especially, the petroleum hydrocarbon content in the pyrolysis residue at 400° C. was lower than 0.3% (a mineral oil content allowed in farmland).

Figure 4:
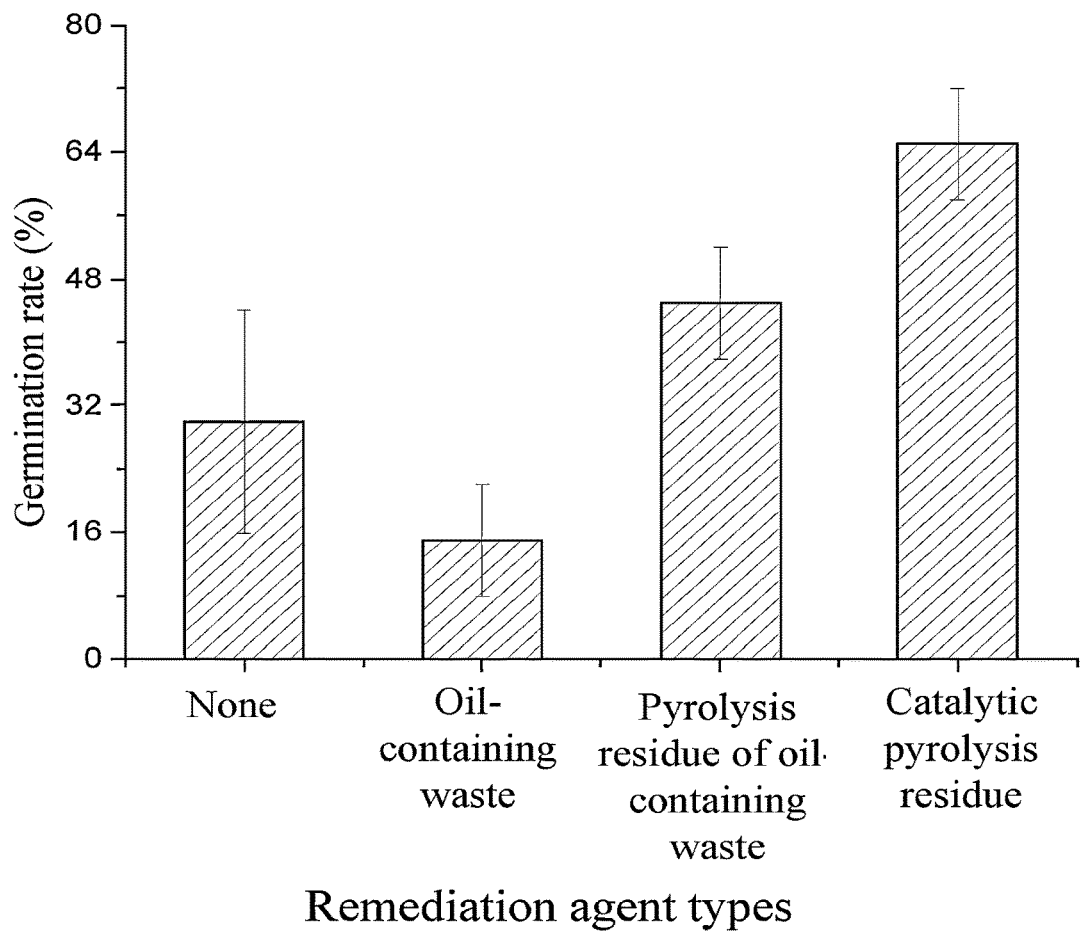
FIG. 4 schematically shows a plant germination rate after different remediation agents are used for remediation of polluted soil according to an example of the present disclosure.

FIG. 4 schematically shows a plant germination rate after different remediation agents are used for remediation of polluted soil according to an example of the present disclosure.

As shown in FIG. 4, the catalytic pyrolysis residue was used to improve the germination rate of plants after the remediation of polluted soil; compared with unremediated soil, the germination rate of soil crops after applying catalytic pyrolysis residue for remediation was significantly increased by 116.67%. This showed that the pyrolysis residue had the function of soil remediation.

Figure 5A:
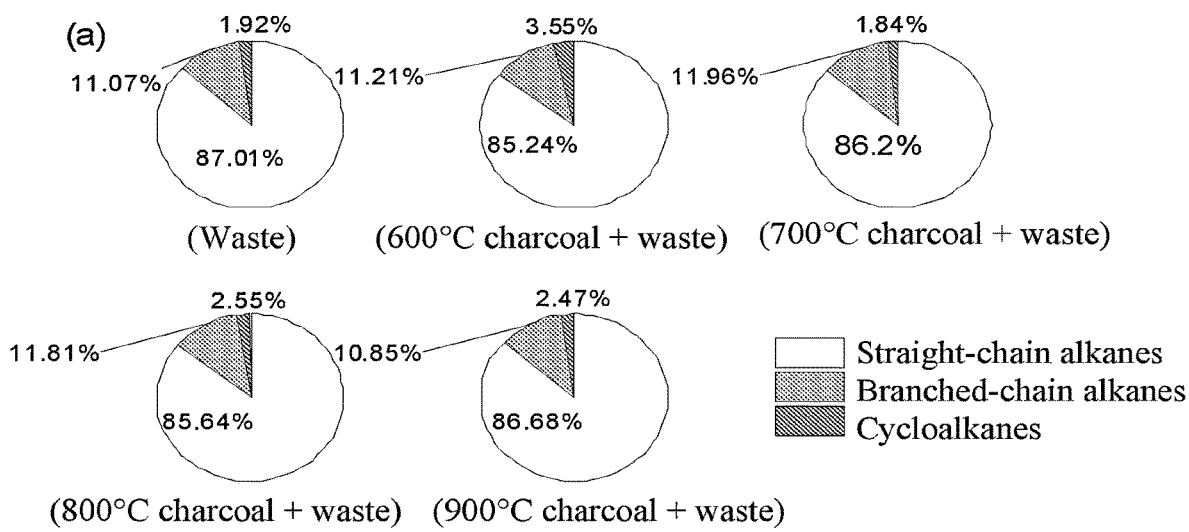
FIG. 5A to FIG. 5B schematically show an influence of a pyrolysis temperature on catalytic pyrolysis of the oily sludge according to an example of the present disclosure.
Figure 5B:
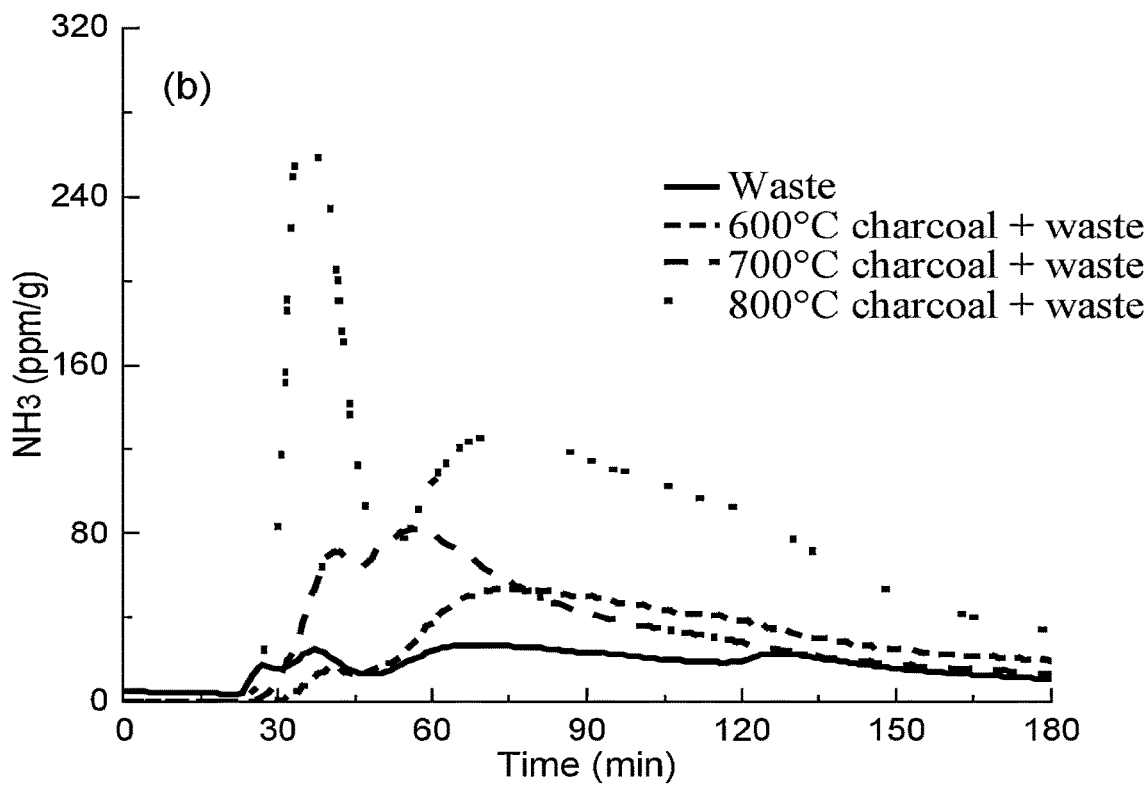

FIG. 5 schematically shows an influence of the target biochar preparation temperature on catalytic pyrolysis of the oily sludge according to an example of the present disclosure.

As shown in FIG. 5, when the biochar preparation temperatures were 600° C., 700° C., 800° C., and 900° C., and other reaction conditions were the same, the biochar at different pyrolysis temperatures hardly changed the chemical composition of the pyrolytic tar, but showed a significant promotion effect on some volatile pollutants containing N/S/Cl such as NH$_3$. The higher pyrolysis temperature of biochar preparation led to a more obvious promotion effect.

Figure 6A:
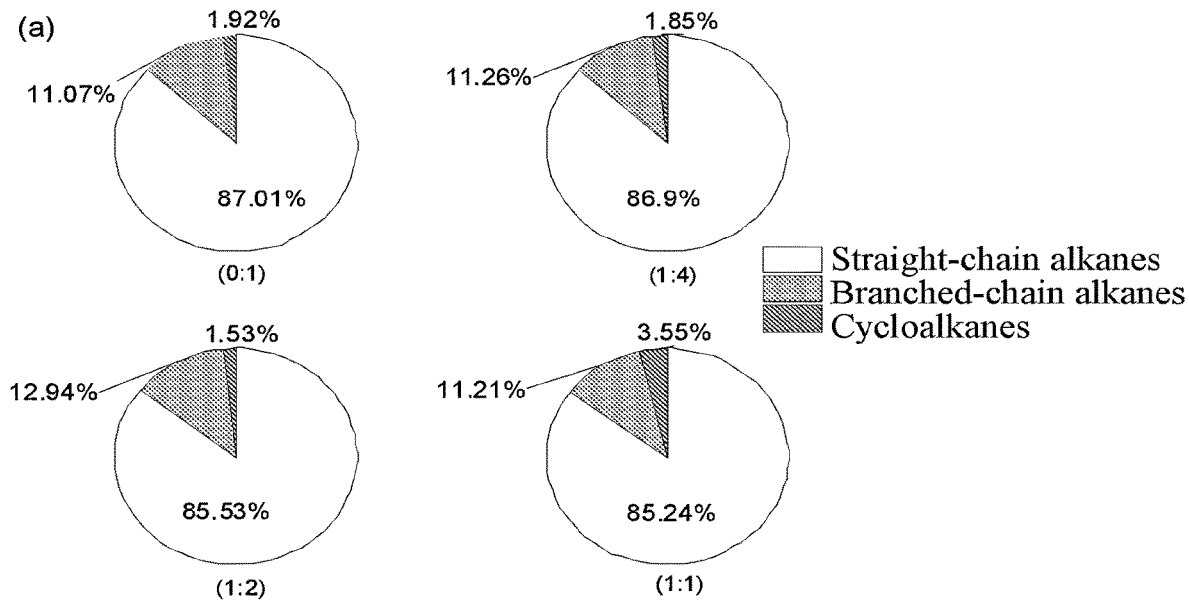
FIG. 6A to FIG. 6B schematically show an influence of a target biochar ratio on pyrolytic reaction of the oily sludge according to an example of the present disclosure.
Figure 6B:
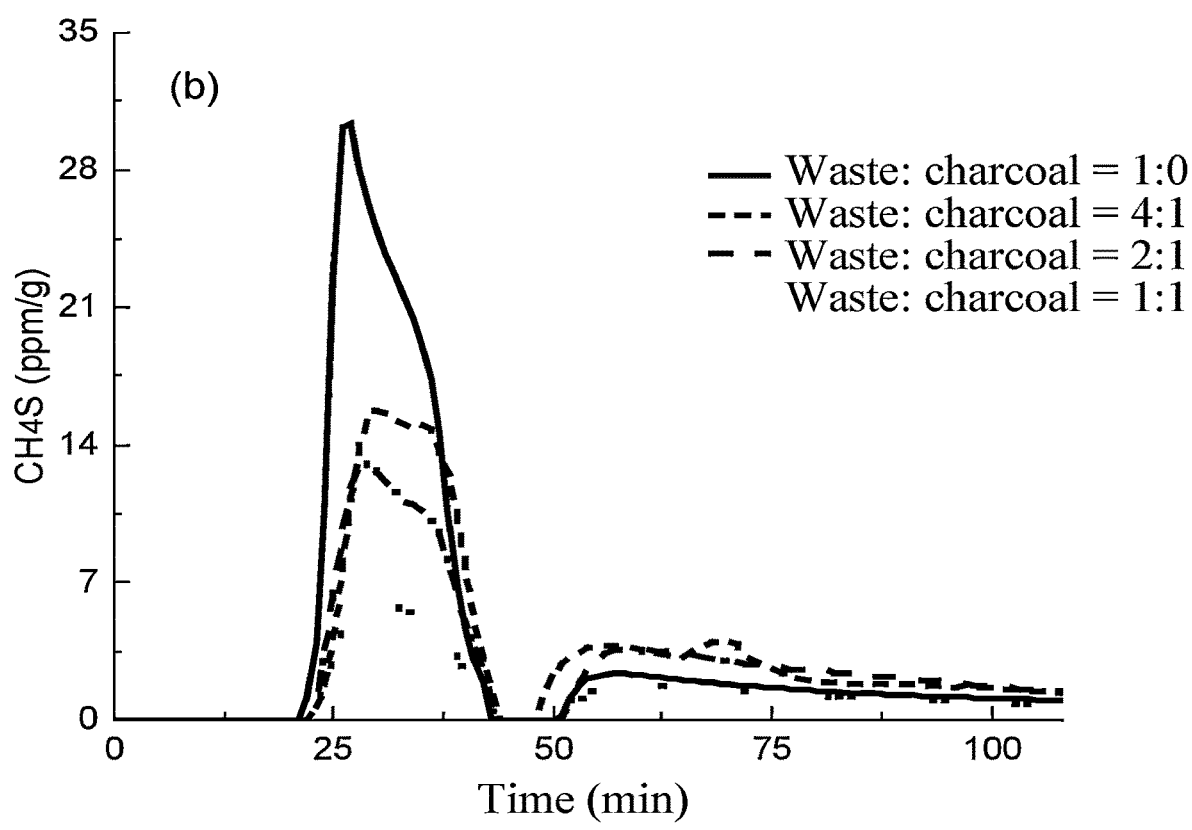

FIG. 6 schematically shows an influence of a target biochar ratio on catalytic pyrolysis of the oily sludge according to an example of the present disclosure.

As shown in FIG. 6, when the target biochar ratio was different and other reaction conditions were the same, the biochar with different addition ratios maintained the chemical composition of pyrolytic tar well, and showed significant inhibitory effect on some volatile pollutants containing N/S/Cl such as CH$_4$S. The higher addition ratio led to a more obvious inhibitory effect.

According to the example of the present disclosure, a catalytic mechanism of the target biochar in the pyrolysis reaction of oily sludge was as follows: the biochar has a rich pore structure and functional groups, and combines with petroleum hydrocarbon molecules in the oily sludge through electrostatic adsorption and complexation to prolong the reaction time during the pyrolysis. The biochar is rich in acid sites and hydroxyl radicals, providing active sites for petroleum hydrocarbon cracking. The abundant mineral components in the biochar, such as calcium, iron and other metal oxides, participate in the catalytic cracking of macromolecular petroleum hydrocarbons, reducing activation energy of desorption and cracking reactions for petroleum hydrocarbons, and fully cracking the petroleum hydrocarbons in the oily sludge at a lower temperature to accelerate a cracking rate. In addition, the carbon element in the target biochar can be used as a reducing agent to participate in the reaction and promote the cracking of petroleum hydrocarbons. The water vapor and carbon monoxide released during the pyrolysis can further participate in the cracking of petroleum hydrocarbons on a surface of the target biochar. Meanwhile, the catalytic effect of the target biochar promotes the cracking of macromolecular organic pollutants to generate small-molecular inorganic pollutants; furthermore, combined with adsorption and complexation effects of the target biochar, the residue immobilization of harmful substances can be realized, to reduce the release of pollutants to oil and gas products during the pyrolysis.

According to the example of the present disclosure, carbon-neutral and renewable biomass solid waste-based raw materials are pyrolyzed to prepare biochar, which is used as a catalyst for the pyrolysis of oily sludge, reducing the adverse environmental impact of biomass solid waste. The method is economically feasible, and realizes treating waste with waste.

According to the example of the present disclosure, in catalytic pyrolysis, the biochar can promote the removal of petroleum hydrocarbons from oily sludge through catalytic cracking, and help slow down the release of N/S/Cl-containing volatile pollutants through adsorption and other effects. Biochar does not need to be separated and recovered, and does not increase the difficulty of disposing of pyrolysis residues.

According to the example of the present disclosure, the catalytic pyrolysis residue is applied to the polluted soil, giving full play to the interaction between biochar and soil microorganisms. The pyrolysis residue not only promotes the deep removal of petroleum hydrocarbons and realizes the complete harmlessness of oily sludge, but also facilitates the fixation and stabilization of various organic matters and heavy metals in oily sludge and polluted soil, the enrichment of microbial communities, the fixation of soil nutrients, the adjustment of soil pH, the improvement of soil fertility, and the efficient removal of soil organic pollutants and restoration of soil metabolism. Therefore, the present disclosure provides a reference scheme for synergistically solving various environmental pollution problems.

The objectives, technical solutions, and beneficial effects of the present disclosure are further described in detail in the above specific examples. It should be understood that the above are merely specific examples of the present disclosure, but are not intended to limit the present disclosure. Any modification, equivalent replacement, or improvement made within the spirit and principle of the present disclosure shall fall within the protection scope of the present disclosure.

What is claimed is:

1. A treatment method for oily sludge, comprising:
    mixing the oily sludge with a target biochar uniformly according to a first preset mass ratio, and conducting catalytic pyrolysis at a first preset temperature to obtain a pyrolysis residue used for soil remediation, wherein the target biochar has a specific surface area of 14.09 $m^2/g$, a pore volume of 0.0359 $cm^2/g$, an average pore size of 3.169 nm; and a surface of the target biochar has functional groups;
    a preparation method of the target biochar comprises:
    subjecting a biomass raw material to anaerobic pyrolysis at a second preset temperature to obtain the target biochar, wherein
    the biomass raw material comprises at least one of the following: waste edible fungus residues, distiller's grains, livestock and poultry manure, moldy biomass, fruit shells, straw, wood chips, and bamboo chips.

2. The method according to claim 1, wherein the second preset temperature comprises 600° C. to 900° C.

3. The method according to claim 2, wherein the second preset temperature is 600° C., 700° C., 800° C., or 900° C.

4. The method according to claim 1, wherein the biomass raw material has a particle size of 20 mesh to 40 mesh.

5. The method according to claim 1, wherein a gas atmosphere of the anaerobic pyrolysis comprises an inert gas atmosphere, and the inert gas comprises at least one or a combination of two or more selected from the group consisting of nitrogen, argon, ammonia, and carbon dioxide.

6. The method according to claim 1, wherein the first preset temperature ranges from 350° C. to 550° C.

7. The method according to claim 6, wherein the first preset temperature is 350° C., 400° C., 450° C., or 500° C.

8. The method according to claim 1, wherein the first preset mass ratio is 8:1 to 1:1.

9. The method according to claim 8, wherein the first preset mass ratio is 8:1, 7:1, 6:1, 5:1, 4:1, 3:1, 2:1, or 1:1.

10. A pyrolysis residue obtained by the treatment method according to claim 1.

11. A method for soil remediation using the pyrolysis residue according to claim 10, comprising:
    mixing the pyrolysis residue with polluted soil uniformly according to a second preset mass ratio to remediate the polluted soil.

12. The method according to claim 11, wherein the second preset mass ratio comprises a dry basis mass ratio, and the dry basis mass ratio is 5:95 to 30:70.

13. The method according to claim 12, wherein the dry basis mass ratio is 5:95, 10:90, 10:70, or 30:70.

* * * * *